Nov. 16, 1971 P. S. BRENIA ET AL 3,620,171
RATTLEPROOF TIE-DOWN ASSEMBLY
Filed Dec. 4, 1969 3 Sheets-Sheet 1
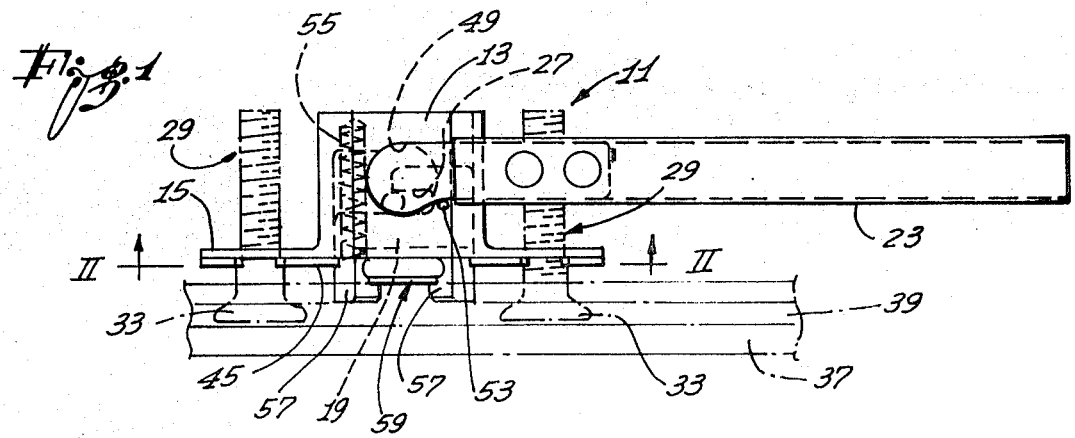
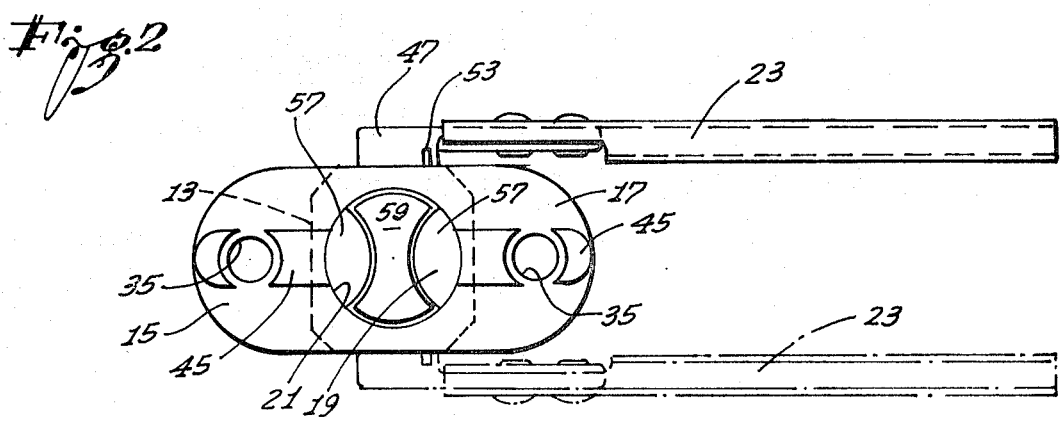
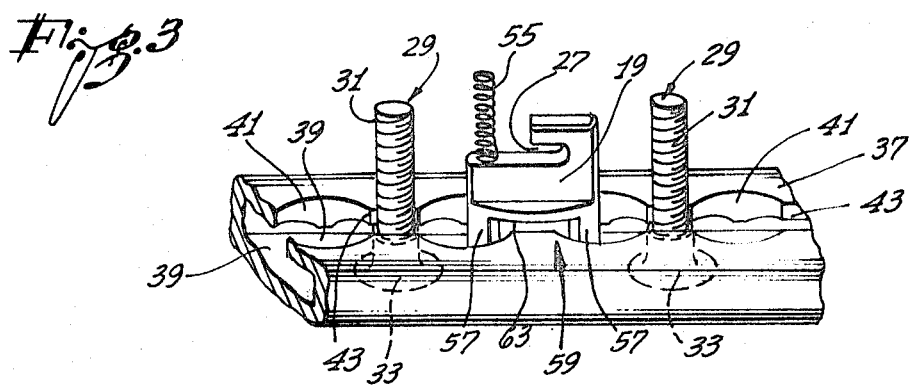
INVENTORS:
Paul S. Brenia
Ernest Prete, Jr.
ATTORNEYS

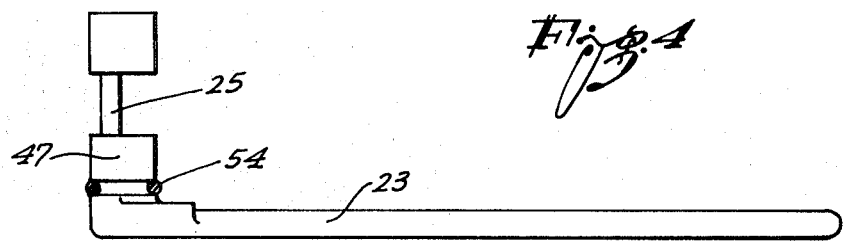
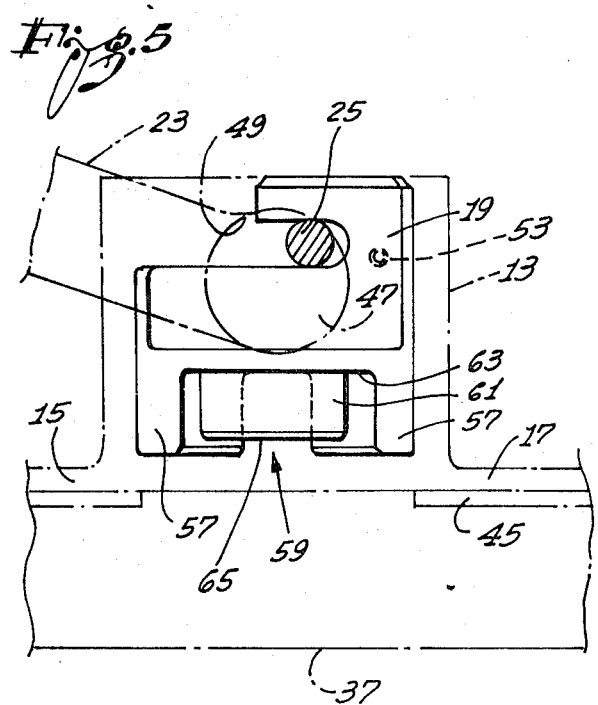
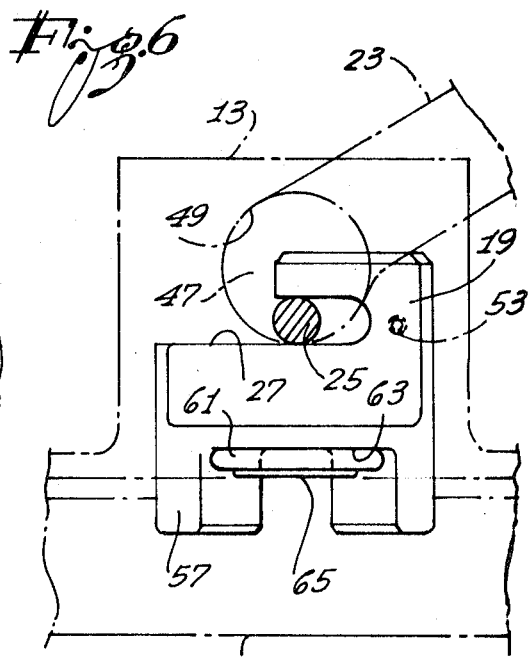
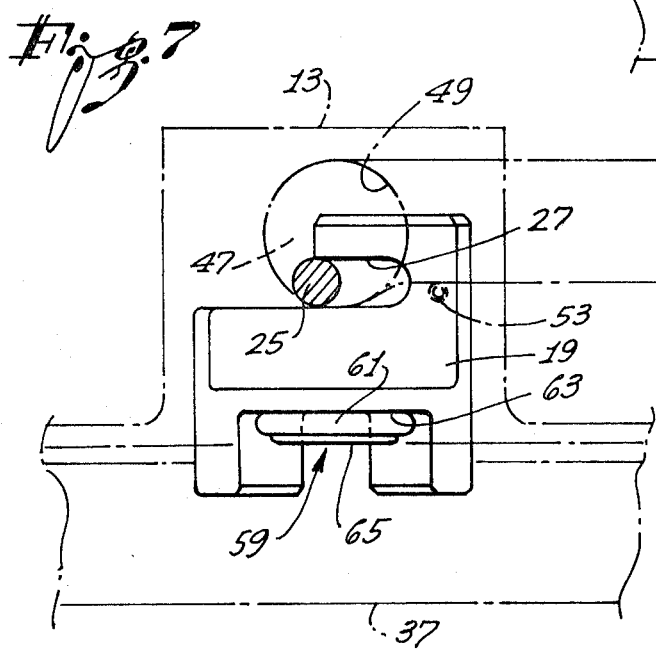

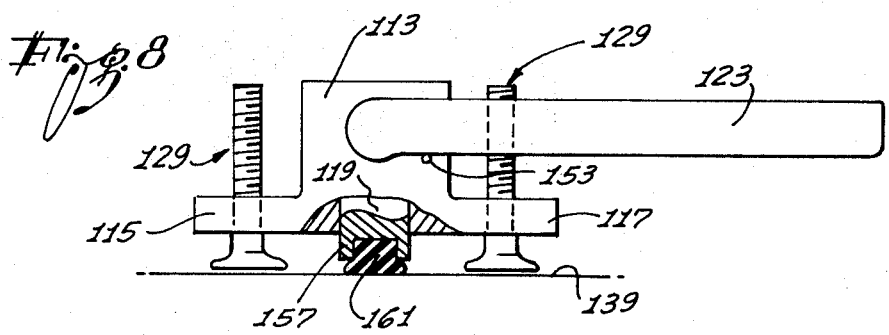
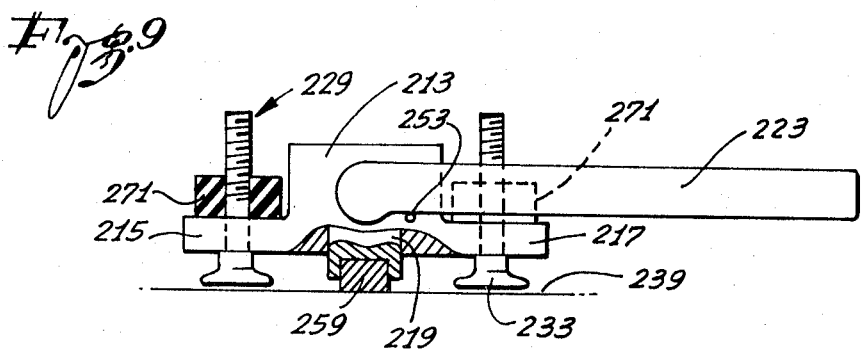

United States Patent Office 3,620,171
Patented Nov. 16, 1971

3,620,171
RATTLEPROOF TIE-DOWN ASSEMBLY
Paul S. Brenia, Torrance, and Ernest Prete, Jr., Woodland Hills, Calif., assignors to Ancra Corporation, El Segundo, Calif.
Filed Dec. 4, 1969, Ser. No. 881,984
Int. Cl. B61d 45/00; B60p 7/08
U.S. Cl. 105—369 A    13 Claims

ABSTRACT OF THE DISCLOSURE

A rattleproof tie-down assembly for use in aircraft and other vehicles comprising a body having a plunger therein which is actuated by an eccentric formed on an operator-controlled handle. The plunger is forced against a fixture by the eccentric so as to tend to force the body away from the fixture and a pair of holding means, mounted on the body, are fitted within the fixture to prevent such a movement of the body. A resilient means is fixed to the plunger for compression against the fixture, or may be mounted between the body and the holding means, so as to prevent the body, holding means, and plunger from vibrating against the fixture.

BACKGROUND OF THE INVENTION

When cargo or other equipment is placed in a moving vehicle, it is often necessary to eliminate as much noise in the vehicle as possible to provide operator and passenger comfort. In most cases, some form of tie-down equipment has been used to lower the noise level, as well as to keep the cargo from shifting from one area of the vehicle to another.

This has been particularly important in airplanes; each passenger seat must be securely fastened to the structure of the plane to prevent it from moving. In order to accomplish this with an acceptable degree of standardization, a seat rail fixture has been developed into which the individual fastening means for each seat, or block of seats, may be inserted or fastened. This fixture can also be used to secure cargo, etc., if desired.

A variety of tie-down devices have been devised and used with such seat rails and have effectively prevented the seats or cargo from moving about the airplane. These devices generally compirse a fitting body having a plurality of holding devices which fit within the seat rail. A plunger, within the body and having a face which is complementary to the shape of the seat rail, is lowered to extend into the rail so that the fitting cannot move relative to it.

These fittings tend to vibrate against the rail in one or more places, causing an undesirable amount of noise in the aircraft or other vehicle. Further, it has been found that in many of such fittings, vibration will cause the plunger to withdraw from its position in the seat rail, allowing the fitting to move relative to the rail.

SUMMARY OF THE INVENTION

In the present invention, a plunger within a body is extended into direct contact with a seat rail fixture by a cam-actuating handle manufactured so that vibration will cause the plunger to be more strongly forced against the rail, rather than withdrawn from it, thus providing a positive down-lock for the fitting. A resilient member mounted on the leading face of the plunger is forced against either the outer or the lower, inner face of the rail, causing a plurality of holding means on the body which are positioned within the rail to be drawn up tightly against an inner face of the rail. This effectively prevents any relative motion between the fitting and the rail, thereby eliminating rattle. Alternatively, resilient members may be fitted between the body and each of the holding means in order to accomplish the same result.

As an additional feature, the tie-down assembly may be manufactured so that the cam-actuating handle can be positioned to place the plunger in a positive up-locked position, as well as the previously described positive down-lock position.

The preferred embodiment of the present invention may be used to tie down one or more seats in an airplane by fastening it to the legs of an individual seat or to the bottom surface of a pallet-like device which carries a plurality of seats. Use of the present invention is not, of course, limited to aircraft applications; it could also be used to tie down cargo or equipment in a truck or other vehicle, or in any fixed location when temporary, rattle-free immovability is required such as with computers, copying machines, etc.

Other advantages, modes, and embodiments of this invention will become obvious to those skilled in the art by reference to the Detailed Description and accompanying drawings which illustrate a plurality of embodiments of the best mode presently contemplated for utilizing the novel principles set forth in the claims.

BRIEF DESCRIPTION OF THE DRAWINGS

FIG. 1 is a side elevation of one embodiment of a fitting according to the present invention, mounted on a seat rail-type fixture;

FIG. 2 is a view of the bottom of the fitting of FIG. 1, with some of the parts removed in order to more clearly illustrate the shape of the plunger;

FIG. 3 is a view of some of the elements of the embodiment of FIG. 1, with the fitting body removed and with the seat rail tilted to more clearly illustrate the positions of the illustrated elements when the fitting is locked to the fixture;

FIG. 4 is a plan view of the fitting-actuating handle;

FIGS. 5–7 are schematic-type illustrations of the relative positions of the plunger and the actuating means at various positions of operation; and FIGS. 8 and 9 are side elevations of alternate embodiments of the present invention.

DETAILED DESCRIPTION

One embodiment of a rattleproof tie-down assembly for fixing an object in a desired location is generally illustrated at 11 in FIG. 1. The fitting generally comprises an upright body 13 having a pair of integral flange-like extensions 15 and 17. A plunger 19 is mounted within an opening 21 in the body 13 and is reciprocally actuatable by an operator-controlled handle 23 having an eccentric member 25 which cooperates with a slot 27 in the plunger.

A pair of locking or holding members 29, having threaded portions 31 and fixture engaging heads 33, are slidably fitted within apertures 35 in the body extensions 15 and 17. The threaded portions 31 are provided on the holding members 29 so that the fitting may be suitably attached to a pallet, seat, or other structure which is to be fixedly positioned. The holding members are threaded tightly into the structure so that there is no freedom of movement between the assembly and the structure.

As shown in FIG. 3, the standard seat rail fixture 37, which can be fixedly mounted on the floor beams of an airplane, the walls and floor of a truck, etc., is provided with a longitudinal slot 39. A series of apertures 41, extending down into the slot 39, are formed in the upper surface of the fixture. The apertures 41 are joined by openings 43, to form consecutive "keyhole-type" slots, which also extend from the upper surface of the fixture down to the slot 39. The entire assembly is then moved so that the heads 33 travel in the slot until they are positioned beneath aperture-joining openings 43. The assembly is then actuated, in a manner to be described, to draw the engaging heads 33 upwardly against that part of the upper surface of the slot 39, which is beneath the aperture-joining openings. If desired, movement of the assembly along the track 37 can be guided by a guide member 45 on the lower surface of the fitting, as shown in FIG. 2. The guide member can be formed to be approximately the same width as the aperture-joining openings 43 so that it abuts the sides of the openings as it is moved along the track.

The handle 23, illustrated in FIG. 4, comprises an elongated, manually grippable portion having a lateral circular extension 47 at one end which fits closely within a bore 49 in the housing 13; bore 49 intersects the upper portion of the plunger opening 21. Intermediate the ends of the extension 47, a reduced portion 25 is formed which is eccentric relative to the axis of the extension. When the hold-down fitting is assembled, the eccentric is positioned within the plunger slot 27 for lateral movement in the slot, as illustrated in FIGS. 5–7.

Rotation of handle 23 to the position illustrated in FIG. 5 causes eccentric 25 to be moved relative to the axis of the extension 47 and to the length of slot 27 to raise plunger 19 within housing 13 so that the lower end of the plunger clears the fixture 37, allowing the assembly to be moved along the rail. In FIG. 6, the handle 23 has been rotated in the clockwise direction, so that the lower end of the plunger has reached the position of maximum extension and will grip the rail 37, in a manner to be described, preventing movement of the assembly along the rail. If the handle is allowed to remain in this position, normal vibration could allow the handle to move in the counterclockwise direction, relieving the pressure of the plunger 19 against the rail, so that the fitting becomes loosely seated, allowing relative movement and rattling between the assembly and the rail. Therefore, as shown in FIG. 7, the handle 23 is rotated to a position in which the eccentric 25 passes a vertical plane extending through the axis of the extension 47 so that vibration tends to move the handle 23 still further in the clockwise direction. This further clockwise movement is prevented, however, by a stop-pin 53 in the body 13, against which the elongated portion of the handle abuts as shown in FIGS. 1 and 7.

Thus, the assembly is provided with a positive downlock which will ensure that it cannot become loosened on the track without manual operation of the handle 23.

If desired, a positive up-lock could also be provided by proper machining of the handle 23 and its extension 47 so that the eccentric 25 can be moved to the left of the vertical plane passing through the axis of extension 47, as shown in FIG. 5, thereby also preventing inadvertent locking of the assembly to the rail.

Alternatively, an O-ring 54 may be mounted within a circumferential groove in the extension 47 so that, when the extension is inserted into the body 13, the O-ring will enter into friction contact with the wall of the bore 49. This friction contact between the handle and the body will keep the handle in any position to which it is moved by the operator, such as that shown in FIG. 5. Although the O-ring will not prevent all vibration-caused movement of the handle, or obviate the necessity of a positive downlock, the minor vibration and the action of positioning the assembly in the track will not cause the handle to change position.

As shown in FIGS. 1 and 3, a spring 55 is positioned between the body 13 and the plunger 19 so that the plunger is always biased toward the extended position. If the eccentric should break or fail, the plunger will be held against the track, preventing relative movement between the assembly and the rail fixture.

With reference now to FIGS. 2 and 3, the plunger 19 is provided with extensions 57 which, when the plunger is in the lowered position, enter into adjacent seat rail apertures 41, so as to straddle the aperture-joining opening 43 between the apertures. The extensions 57 abut the sides of the apertures 41, preventing movement of the plunger, and thus the assembly, relative to the rail. A central portion 59 on the plunger seats on the supper surface of the rail 37 and abuts against that surface on the opposite sides of the aperture-joining opening 43.

In order to provide the positive down-lock feature previously described, to ensure the operation of the assembly in spite of variations in the height of slot 39 and thickness of seat rail 37, and to ensure that the fitting remains tightly in place and rattle-free during periods of negative gravity, such as in an airplane, a resilient or biasing structure must be provided between the assembly and the track. In the embodiment illustrated in FIGS. 1–7, this resilient structure comprises a member 61 which may be formed of any suitable material, such as rubber, springs, or spring-like substance which is bonded to a surface 63 on the plunger intermediate the extensions 57. If desired, the lower edge of the resilient member 61 can be provided with a metal plate 65 to prevent wearing of the rubber against the seat rail 37. Thus, in the embodiment, the resilient member 61 and plate 65 form the central portion 59 of the lower end of the plunger. As shown in FIGS. 5–7, as the plunger is lowered against the track, the resilient member 61 becomes compressed so that it exerts a biasing force on the body 13, thereby urging the seat rail engaging heads 33 against the upper surface of the slot 39. In this manner, the assembly is held firmly in place on the rail in a rattle-free manner. Any relative movement between the fitting and the fixture will be absorbed in the central portion 52.

In the embodiment shown in FIG. 8, the structural members which are identical to those of the previously described embodiment have been provided with similar labels, preceded by the numeral 1, so that body 13 now becomes body 113, etc. In this alternate embodiment, a plunger 119 having extensions 157 is provided with a resilient member 161 which abuts against the bottom of the seat rail slot 139 in the manner shown.

In the embodiment shown in FIG. 9, wherein identical structure has been provided with identical labels, preceded by the numeral 2, the plunger 219 is provided with a central portion 259 at the lower end thereof which is not necessarily resilient and which may impinge on either the upper surface of the rail or the lower surface of the slot. In this embodiment, however, resilient members 271 are positioned on the holding members 229 between the body extensions 215 and 217 and the apparatus to be held in place (not shown). With this structure, the seat rail engaging heads are drawn up against the upper surface of the slot 239, due to the central portion 259 of the plunger being forced against the fixture. Actuation of the handle 223 to the position shown, serves to bias the body 213 upwardly against the weight of the structure being fixed to produce the desired result.

Thus, the applicants have provided several embodiments of a new and improved concept of a rattleproof tie-down assembly which can be used in a wide range of applications and which yields a true advance in the art. Many further modifications and alterations will be obvious to those skilled in the art, wherefore, what is claimed as the invention is:

1. A tie-down assembly for use with a fixture having consecutive, joined apertures therein comprising:
    a body,
    a plunger reciprocally mounted in said body,
    means for reciprocally actuating said plunger within said body between
        a first position in which it is extended from said body for operational contact with such a fixture and
        a second position in which it is retracted from such operational contact position, and comprising
            a slot in said plunger,
            eccentric means movable in said slot, and means for moving said eccentric means about an axis for movement of said eccentric means in said slot to actuate said plunger between said first and second positions, means extending from said body for insertion into and gripping within such a fixture, and means for biasing said assembly relative to the fixture when said means extending from said body are in gripping relation to such a fixture and said plunger is in said first position.

2. The assembly of claim 1 including means for preventing movement of said eccentric means when it has been moved a predetermined distance about said axis to position said plunger in said first position.

3. The assembly of claim 2 including means for restraining movement of said eccentric means relative to said axis.

4. A tie-down assembly for use with a fixture having consecutive, joined apertures therein comprising:
a body,
a plunger reciprocally mounted in said body,
means for reciprocally actuating said plunger within said body between
a first position in which it is extended from said body for operational contact with such a fixture and
a second position in which it is retracted from such operational contact position,
means extending from said body for insertion into and gripping within such a fixture, and
means for biasing said assembly away from such a fixture when said means extending from said body are in gripping relation to such a fixture and said plunger is in said first position including
a resilient member mounted on the operational contact end of said plunger for compression between said plunger and such a fixture as said plunger is moved from said second to said first position.

5. An assembly for fastening a structure to a fixture comprising
a body,
a plunger in said body having
a resilient contact means for interlocking with said fixture in a biasing relationship thereto and
means for cooperating with a plunger actuating means,
a plunger actuating means extending through said body and having
means acting with said plunger cooperation means to actuate said plunger between
an interlocking position and
a retracted position,
means for releasably attaching said body to the fixture, and
means for releasably attaching said body to the structure,
said resilient contact means biasing said body relative to said fixture to draw said fixture attachment means into a gripping relationship with the fixture when said plunger is in said interlocking position.

6. The assembly of claim 5 including means for locking said plunger in said interlocking position.

7. The assembly of claim 5 wherein said plunger includes extension means on the operational contact end thereof which extend into consecutive apertures in such a fixture when said plunger is in said interlocking position.

8. The assembly of claim 5 including a contact plate mounted on said resilient contact means to prevent contact between said resilient contact means and the fixture.

9. An assembly for fastening a structure to a fixture comprising
a body,
means for releasably attaching said body to both the structure and the fixture,
a plunger reciprocally mounted within said body,
means for reciprocally moving said plunger between
a retracted position in which said attaching means are attached to the structure and not to the fixture and said plunger is not in pressure contact with the fixture and
a locking position in which said attaching means are attached to the structure and to the fixture and said plunger is in pressure contact with the fixture, and
compressible means intermediate said plunger and the fixture, compressed when said plunger is in said locking position to prevent said attaching means from being separated from the attachment with the fixture.

10. An assembly for fastening a structure to a fixture comprising
a body,
means for releasably attaching said body to both the structure and the fixture,
a plunger reciprocally mounted within said body,
means for reciprocally moving said plunger between
a retracted position in which said attaching means are attached to the structure and not to the fixture and said plunger is not in pressure contact with the fixture and
a locking position in which said attaching means are attached to the structure and to the fixture and said plunger is in pressure contact with the fixture, and
compressible means in biasing contact with both the body and the structure and cooperating with said attachment means, compressed when said plunger is in said locking position to prevent said attaching means from being separated from the attachment with the fixture.

11. A tie-down assembly comprising
a body,
at least one engaging head reciprocally mounted within said body and having
means thereon for fastening a unit to be tied down thereto,
a plunger movably mounted within said body,
means for actuating said plunger against a fixture to move said at least one engaging head into contact with said fixture, and
compressible means interposed between the fixture and said plunger to create a locking force therebetween to hold said assembly to the fixture in rattleproof relationship thereto.

12. A tie-down assembly comprising
a body,
at least one engaging head reciprocally mounted within said body and having
means thereon for fastening a unit to be tied down thereto,
a plunger movably mounted within said body,
means for actuating said plunger against a fixture to move said at least one engaging head into contact with said fixture, and
compressible means interposed between said body and the unit to be tied down at said at least one engaging head to create a locking force between the fixture and said body to hold said assembly to the fixture in rattleproof relationship thereto.

13. An assembly for fastening a structure to a fixture comprising
a body,
a plunger in said body having
a contact surface for interlocking with the fixture and a slot for cooperation with a plunger actuating means,.

a plunger actuating means extending through said body and having eccentric means extending into said slot and rotatable about an axis to actuate said plunger between an interlocking position and a retracted position, means for releasably attaching said body to the fixture, means for releasably attaching said body to the structure, and means for biasing said body relative to the fixture to draw said fixture attachment means into a gripping relationship to the fixture when said plunger is in said interlocking position.

References Cited

UNITED STATES PATENTS

| | | | |
|---|---|---|---|
| 2,688,289 | 9/1954 | Sterling | 105—369 A |
| 2,688,504 | 9/1954 | Parker | 105—369 A |
| 3,212,457 | 10/1965 | Looker | 105—369 A |
| 3,241,501 | 3/1966 | Watts | 105—369 A |
| 3,282,229 | 11/1966 | Elsner | 105—369 A |
| 3,306,234 | 2/1967 | Hansen et al. | 105—369 A |
| 1,548,053 | 8/1925 | Mead | 105—369 B |
| 1,763,034 | 6/1930 | Bunker | 106—369 B |
| 3,274,967 | 9/1966 | Igaue et al. | 105—369 B |

DRAYTON E. HOFFMAN, Primary Examiner

U.S. Cl. X.R.

248—361 A